(12) United States Patent
Kogawa et al.

(10) Patent No.: US 11,520,305 B2
(45) Date of Patent: Dec. 6, 2022

(54) ELECTRONIC APPARATUS AND METHOD

(71) Applicant: KABUSHIKI KAISHA TOSHIBA, Tokyo (JP)

(72) Inventors: Tsuyoshi Kogawa, Kanagawa (JP); Toshihisa Nabetani, Kanagawa (JP); Tsuguhide Aoki, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 53 days.

(21) Appl. No.: 16/807,322

(22) Filed: Mar. 3, 2020

(65) Prior Publication Data

US 2021/0088997 A1 Mar. 25, 2021

(30) Foreign Application Priority Data

Sep. 19, 2019 (JP) .............................. JP2019-170918

(51) Int. Cl.
  *G05B 19/05* (2006.01)
(52) U.S. Cl.
  CPC .. *G05B 19/054* (2013.01); *G05B 2219/13009* (2013.01); *G05B 2219/15117* (2013.01)
(58) Field of Classification Search
  CPC ........ G05B 19/054; G05B 2219/13009; G05B 2219/15117
  USPC .......................................................... 700/12
  See application file for complete search history.

(56) References Cited

U.S. PATENT DOCUMENTS

| | | | |
|---|---|---|---|
| 9,397,782 B2 * | 7/2016 | Wang | G05D 1/0038 |
| 9,864,370 B2 * | 1/2018 | Wang | G05D 1/0022 |
| 10,491,312 B1 * | 11/2019 | Shimizu | H04B 15/00 |
| 10,514,689 B2 * | 12/2019 | Wang | B64D 45/0034 |
| 10,721,089 B1 * | 7/2020 | Shinar | H04L 12/2832 |
| 10,866,302 B2 * | 12/2020 | Wu | G01S 5/0289 |
| 11,137,753 B2 * | 10/2021 | Olson | G05D 1/0022 |
| 2010/0256784 A1 | 10/2010 | Seberger | |
| 2013/0041481 A1 | 2/2013 | Seberger | |

(Continued)

FOREIGN PATENT DOCUMENTS

| | | | |
|---|---|---|---|
| CN | WO2019161531 | * | 8/2019 |
| CN | 112882393 | * | 6/2021 |

(Continued)

OTHER PUBLICATIONS

Yoshida, et al., "Dynamic State-Predictive Control for a Remote Control System with Large Delay Fluctuation", 2018 IEEE International Conference on Consumer Electronics (ICCE), 2018, 6 pages.

*Primary Examiner* — Hien D Khuu
(74) *Attorney, Agent, or Firm* — Holtz, Holtz & Volek PC

(57) ABSTRACT

According to one embodiment, an electronic apparatus includes a receiver, a processor and a transmitter. The receiver receives a reception signal including a value indicating a physical quantity related to operation of a control target object at a communication destination. The processor determines a state of wireless communication between the electronic apparatus and the communication destination. The processor calculates a target value for instructing operation of the control target object. The processor generates a transmission signal including a value obtained by modifying the target value. The transmitter transmits the transmission signal to the control target object.

18 Claims, 9 Drawing Sheets

(56) References Cited

U.S. PATENT DOCUMENTS

| | | | |
|---|---|---|---|
| 2015/0147976 A1* | 5/2015 | Wang | H04L 69/28 |
| | | | 455/65 |
| 2017/0029107 A1* | 2/2017 | Emami | G01S 13/003 |
| 2017/0238802 A1* | 8/2017 | Suzuki | A61B 5/316 |
| 2018/0196424 A1* | 7/2018 | Kim | G05D 1/0044 |
| 2018/0364705 A1* | 12/2018 | Yunoki | H04N 7/18 |
| 2019/0215254 A1 | 7/2019 | Yoshida | |
| 2020/0068584 A1* | 2/2020 | Matsuki | G05D 1/0038 |
| 2020/0382983 A1* | 12/2020 | Ma | H04W 24/10 |
| 2021/0069911 A1* | 3/2021 | Katou | G05B 19/042 |

FOREIGN PATENT DOCUMENTS

| | | | |
|---|---|---|---|
| EP | 1047224 A2 | | 10/2000 |
| JP | 2000307603 A | | 11/2000 |
| JP | 2011150516 A | | 8/2011 |
| JP | 2015535377 A | | 12/2015 |
| JP | 2017046075 A | | 3/2017 |
| JP | 2018116385 A | | 7/2018 |
| KR | 20040061903 | * | 7/2004 |
| KR | 20180129768 | * | 12/2018 |
| WO | 2013069188 A1 | | 5/2013 |
| WO | 2018034191 A1 | | 2/2018 |

* cited by examiner

ELECTRONIC APPARATUS AND METHOD

CROSS-REFERENCE TO RELATED APPLICATIONS

This application is based upon and claims the benefit of priority from Japanese Patent Application No. 2019-170918, filed Sep. 19, 2019, the entire contents of which are incorporated herein by reference.

FIELD

Embodiments described herein relate generally to an electronic apparatus and a method for instructing an operation of an electronic apparatus at a communication destination.

BACKGROUND

There has been known a wireless communication apparatus that can transmit an instruction for an operation (a position, speed, a rotation angle, the number of rotations, and the like) of an electronic apparatus such as a robot at a communication destination. Depending on a state of wireless communication between the wireless communication apparatus and the electronic apparatus, communication of a transmission signal including the instruction for the operation is delayed and the electronic apparatus does not operate as instructed. Therefore, there is a demand for a wireless communication apparatus capable of instructing the operation of an electronic apparatus which is less affected by the state of wireless communication.

DETAILED DESCRIPTION

Figure 1:
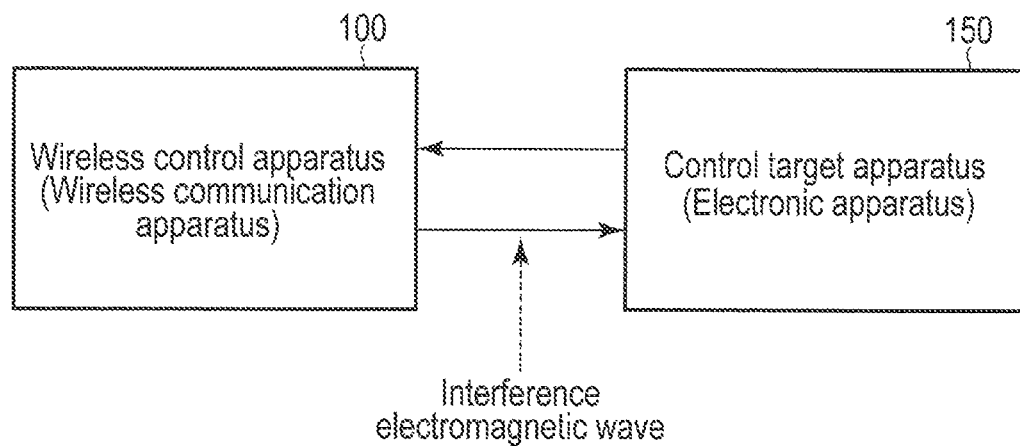
FIG. 1 is a diagram showing a communication system according to a first embodiment.

Embodiments for carrying out the present invention are explained below with reference to the drawings. The present disclosure is only an example. The present invention is not limited by contents described in the following embodiments. Modifications easily conceived by those skilled in the art are naturally included in the scope of the present disclosure. To further clarify the explanation, sizes, shapes, and the like of portions are sometimes changed from those in actual implementation forms and schematically shown in the drawings. In a plurality of drawings, the same reference numbers are sometimes added to elements corresponding thereto and detailed explanation of the portions is omitted.

In general, according to one embodiment, an electronic apparatus includes a receiver, a processor and a transmitter. The receiver receives a reception signal including a value indicating a physical quantity related to operation of a control target object at a communication destination. The processor determines, based on at least one of electric power of a signal and the reception signal, a state of wireless communication between the electronic apparatus and the communication destination. The processor calculates, based on the value indicating the physical quantity, a target value of the physical quantity for instructing operation of the control target object. The processor generates, according to the state of the wireless communication, a transmission signal including a value obtained by modifying the target value. The transmitter transmits the transmission signal to the control target object.

First Embodiment

FIG. 1 shows a wireless communication system according to the first embodiment. In this system, a wireless control apparatus 100 is a wireless communication apparatus that transmits a wireless signal (this wireless signal is hereinafter referred to as transmission signal) for instructing the operation of a control target apparatus 150. The wireless control apparatus 100 may be referred to as an electronic apparatus. The control target apparatus 150 is an electronic apparatus that receives the transmission signal of the wireless control apparatus 100 and operates. The control target apparatus 150 is, for example, an AGV (Automatic (Automated) Guided Vehicle), a robot, a robot arm, or the like and may be a motor included in these apparatuses. An instruction for the operation of the control target apparatus 150 is performed by instructing a target value of a physical quantity related to the operation of the control target apparatus 150. For example, a target value of a position, speed, acceleration, or the like related to the operation of the control target apparatus 150 is included in the transmission signal and transmitted. The target value includes at least one of the position, the speed, and the acceleration. Note that the position, the speed, and the acceleration include not only values in a three-dimensional space but also a position, speed, and acceleration in rotation. For example, the position includes a rotation angle and the number of rotations, the speed includes rotational speed, and the acceleration includes rotational acceleration.

The control target apparatus 150 receives the transmission signal and operates to achieve the target value of the instructed operation. In operating, the control target apparatus 150 measures a value indicating a physical quantity related to the operation. The physical quantity is, for example, the position, the speed, the acceleration, or the like. In the following explanation, the value measured by the control target apparatus is referred to as measurement value as well. The measurement value may include measured time. The control target apparatus 150 transmits a wireless signal including the measurement value to the wireless control apparatus 100 (this signal is hereinafter referred to as measurement signal as well). The wireless control apparatus 100 receives the measurement signal. For the wireless control apparatus 100, the measurement signal is a reception signal. In the following explanation, the reception signal of the wireless control apparatus 100 represents the measurement signal. The wireless control apparatus 100 modifies the target value of the control target apparatus 150 based on the measurement value included in the reception signal and communicates the target value to the control target apparatus 150 with the next transmission signal.

In communication between the wireless control apparatus 100 and the control target apparatus 150, interference due to an electromagnetic wave sometimes occurs. The electromagnetic wave is, for example, an electromagnetic wave generated by an apparatus different from the wireless control apparatus 100 and the control target apparatus 150 (such an electromagnetic wave is hereinafter referred to as interference electromagnetic wave as well). Communication between the wireless control apparatus 100 and the control target apparatus 150 is hindered by the interference electromagnetic wave. In this case, the wireless control apparatus 100 does not transmit the transmission signal until electric power of the interference electromagnetic wave becomes smaller than a preset value. Thus, the transmission of the transmission signal by the wireless control apparatus 100 is sometimes delayed. Therefore, in some case, the control target apparatus 150 is late in receiving the transmission signal from the wireless control apparatus 100. In this case, the operation of the control target apparatus 150 is different from operation instructed by the wireless control apparatus 100. The wireless control apparatus 100 needs to instruct the operation of the control target apparatus 150 which is less affected by a state of wireless communication between the wireless control apparatus 100 and the control target apparatus 150 (hereinafter simply referred to as state of wireless communication as well).

When receiving the measurement signal including the measurement value from the control target apparatus 150, the wireless control apparatus 100 determines the state of the wireless communication from at least one of electric power of a signal received from the control target apparatus 150 and the reception signal. The wireless control apparatus 100 modifies, based on the state of the wireless communication and the measurement value included in the reception signal, the target value calculated by the wireless control apparatus 100 and transmits a transmission signal including the modified target value to the control target apparatus 150. For example, when the state of the wireless communication is deteriorated, the wireless control apparatus 100 modifies the target value considering a delay in reception of the transmission signal by the control target apparatus 150. Accordingly, the wireless control apparatus 100 can instruct the operation of the control target apparatus 150 while being less affected by the state of the wireless communication between the wireless control apparatus 100 and the control target apparatus 150.

Note that, as the communication between the wireless control apparatus 100 and the control target apparatus 150, communication conforming to any communication standard can be applied. The communication standard is, for example, wireless LAN, 3G, 4G, LTE, 5G, Bluetooth (registered trademark), or ZigBee (registered trademark). In this embodiment, as an example, the communication by the wireless LAN is explained.

Figure 2:
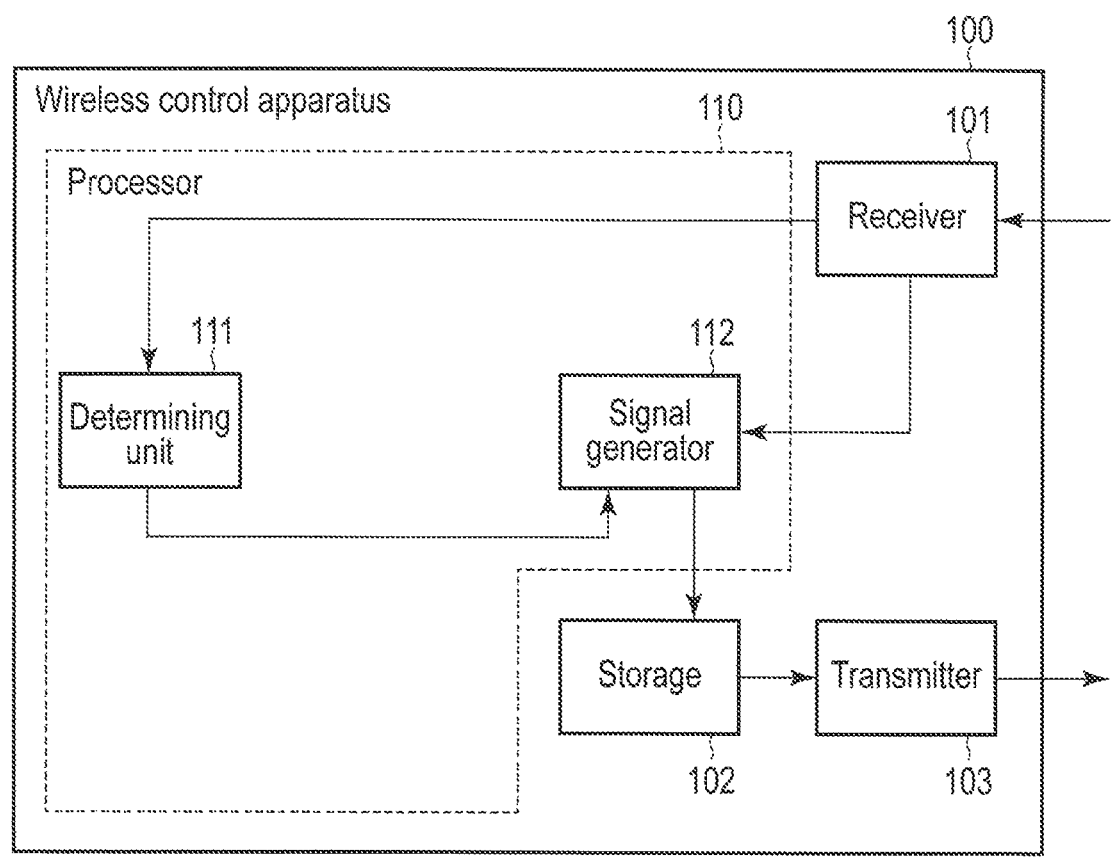
FIG. 2 is a configuration diagram of a wireless control apparatus in the first embodiment.

A configuration example of the wireless control apparatus 100 is shown in FIG. 2. The wireless control apparatus 100 includes a receiver 101, a storage 102, a transmitter 103, and a processor 110. The processor 110 includes a determining unit 111 and a signal generator 112.

The receiver 101 receives, as a reception signal, a measurement signal including a measurement value. In this embodiment, the receiver 101 receives the reception signal from the control target apparatus 150. However, the receiver 101 may receive the reception signal via a relay and a relay system. The receiver 101 decrypts the reception signal and sends the reception signal to the determining unit 111 and the signal generator 112. The decrypted reception signal is used for determination of the state of the wireless communication. At least the measurement value in the decrypted reception signal is use for calculation of a target value in the signal generator 112. Information sent to the determining unit 111 and the signal generator 112 by the receiver 101 does not need to be the same. For example, the receiver 101 may send the decrypted reception signal to the determining unit 111 and send the measurement value included in the decrypted reception signal to the signal generator 112.

The receiver 101 receives a signal other than the reception signal in a wireless communication link between the wireless control apparatus 100 and the control target apparatus 150 (hereinafter simply referred to as wireless communication link). The receiver 101 can measure electric power of the received signal. The receiver 101 sends information based on the electric power to the determining unit 111. The information including the electric power is used for determination of the state of the wireless communication in the determining unit 111.

The determining unit 111 determines the state of the wireless communication based on at least one of the information included in the decrypted reception signal and the information concerning the electric power of the signal in the wireless communication link sent from the receiver 101. The information included in the decrypted reception signal means, besides the measurement value in the control target apparatus 150, a time interval in which a frame included in the reception signal is input to the determining unit 111, the number of times and a ratio of retransmitting of the reception signal, a data size of the frame included in the reception signal, a power level of the reception signal, an MCS (Modulation and Coding Scheme) of the reception signal, and the like. In this embodiment, as an example, the determining unit 111 determines the state of the wireless communication based on the information concerning the electric power of the signal in the wireless communication link. The determining unit 111 sends information representing the determined state of the wireless communication to the signal generator 112. The information representing the state of the wireless communication is used for modification of the target value in the signal generator 112.

For example, when the electric power of the signal in the wireless communication link is equal to or larger than a preset threshold, the determining unit 111 determines that the state of the wireless communication is a first state indicating that the wireless communication between the wireless control apparatus 100 and the control target apparatus 150 is hindered. When the electric power of the signal in the wireless communication link is smaller than the preset threshold, the determining unit 111 determines that the state of the wireless communication is a second state indicating that the wireless communication between the wireless control apparatus 100 and the control target apparatus 150 is not hindered.

The determining unit 111 may determine the state of the wireless communication based on a ratio of a time in which the electric power of the signal in the wireless communication link is equal to or larger than the preset threshold. For example, when the ratio of the time in which the electric power of the signal in the wireless communication link is equal to or larger than the preset threshold is equal to or larger than a preset threshold of the ratio, the determining unit 111 determines that the state of the wireless communication is the first state indicating that the wireless communication between the wireless control apparatus 100 and the control target apparatus 150 is hindered. When the ratio of the time in which the electric power of the signal in the wireless communication link is equal to or larger than the preset threshold is smaller than the preset threshold of the ratio, the determining unit 111 determines that the state of the wireless communication is the second state indicating that the wireless communication between the wireless control apparatus 100 and the control target apparatus 150 is not hindered.

The signal generator 112 generates a transmission signal including a target value corresponding to the state of the wireless communication. The signal generator 112 calculates a provisional target value (hereinafter referred to as provisional value as well) from the measurement value sent from the receiver 101. For example, the signal generator 112 calculates at least one of a position, speed, and acceleration in the control target apparatus 150 from the measurement value representing the position transmitted from the control target apparatus 150. As an example, the provisional value is a target value at the time when the state of the wireless communication is not deteriorated. The signal generator 112 modifies the target value to a value corresponding to the state of the wireless communication based on the information representing the state of the wireless communication sent from the determining unit 111. For example, when the state of the wireless communication is deteriorated, the signal generator 112 modifies the provisional value and sets the modified provisional value as a target value. The signal generator 112 generates a transmission signal including the target value. The signal generator 112 stores the generated transmission signal to the storage 102.

The signal generator 112 does not need to always modify the target value. For example, the signal generator 112 does not need to modify the target value when there is no problem in the communication between the wireless control apparatus 100 and the control target apparatus 150 based on the information representing the state of the wireless communication sent from the determining unit 111. In such a case, a delay causing a problem does not occur in the communication between the wireless control apparatus 100 and the control target apparatus 150. Therefore, the signal generator 112 does not need to modify the target value. The signal generator 112 generates a transmission signal including the provisional value as the target value.

The storage 102 stores the transmission signal sent from the signal generator 112 and outputs the transmission signal to the transmitter 103 on an LIFO (Last-In First-Out) scheme. The storage 102 is a memory or the like and, for example, a RAM (Random Access Memory), a PROM (Programmable ROM), an EPROM (Erasable PROM), an EEPROM (Electrically EPROM), a flash memory, or a register. Besides the inside of the wireless control apparatus 100, the storage 102 may be provided on the outside of the wireless control apparatus 100. When the storage 102 is provided on the outside of the wireless control apparatus 100, the storage 102 may be the cloud that stores information through the Internet.

The transmitter 103 extracts the transmission signal from the storage 102, modulates the transmission signal, and transmits the transmission signal to the control target apparatus 150.

The processor 110 including the determining unit 111 and the signal generator 112 is an electronic circuit including a controller and an arithmetic apparatus. Examples of the electronic circuit can include a general-purpose processor, a central processing unit (CPU), a microprocessor, a digital signal processor (DSP), an ASIC, an FPGA, and a combination of the foregoing.

The components of the wireless control apparatus 100 are explained above. Connection among the components may be wired connection or may be wireless connection. The wireless control apparatus 100 may be implemented as an IC (Integrated Circuit) or an LSI (Large Scale Integration). The components of the wireless control apparatus 100 may be collectively implemented on one chip or a part of the components may be implemented on the other chip.

Figure 3:
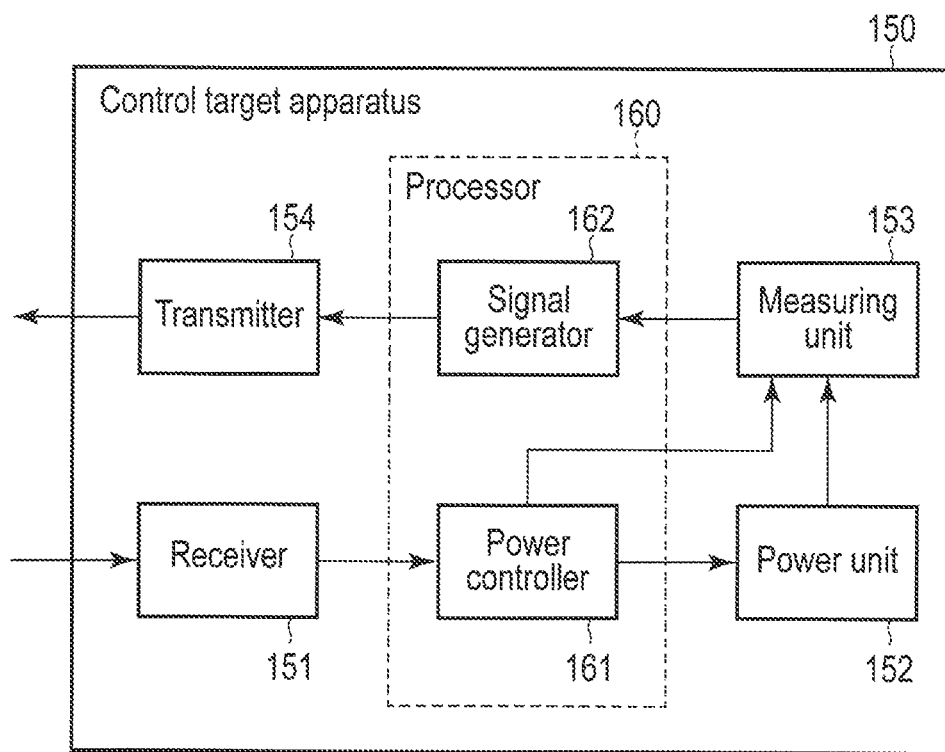
FIG. 3 is a configuration diagram of a control target apparatus in the first embodiment.

The control target apparatus 150 is an apparatus that receives a transmission signal transmitted from the wireless control apparatus 100 and performs operation. The control target apparatus 150 is, for example, a robot that moves using wheels or a robot that walks using a plurality of legs. The control target apparatus 150 includes a robot arm and a tip-movable endoscope. Besides, the control target apparatus 150 includes a vehicle, a truck, and a flying object (a manned airplane or an unmanned aerial vehicle (UAV) such as a drone). In this embodiment, as an example, the control target apparatus is explained as the robot that moves using the wheels. A configuration example of the control target apparatus 150 is shown in FIG. 3. The control target apparatus 150 includes a receiver 151, a power controller 161, a signal generator 162, a power unit 152, a measuring unit 153, a transmitter 154, and a processor 160. The processor 160 includes a power controller 161 and a signal generator 162.

The receiver 151 receives a transmission signal including a target value. The receiver 151 decrypts the transmission signal and sends information including the target value to the power controller 161. The power controller 161 instructs the operation of the power unit 152 based on the information.

The power unit 152 is a driving device mounted on the control target apparatus 150. The power unit 152 is, for example, a motor, a wheel, an engine, or a propeller. In this embodiment, as an example, the power unit 152 is explained as a motor or a wheel. The power unit 152 is driven by the instruction of the power controller 161 and drives the control target apparatus 150. For example, when the number of rotations of the power unit 152 is instructed by the power controller 161, the power unit 152 is driven at the instructed number of rotations.

The measuring unit 153 measures the position of the control target apparatus 150. The position of the control target apparatus 150 may be, for example, a three-dimensional position of the control target apparatus 150 or a position in rotation including a rotating direction, a rotation angle, and the number of rotations of the power unit 152. The measuring unit 153 sends a measurement value of the measurement to the signal generator 162. Any apparatus may is applicable to the measuring unit 153 if the position of the control target apparatus 150 can be measured. However, in this embodiment, as an example, the measuring unit 153 is an encoder that measures a position in rotation of the motor. Besides, the measuring unit 153 may be, for example, a GNSS (Global Navigation Satellite System) that acquires a three-dimensional position of the control target apparatus 150.

The signal generator 162 generates a measurement signal including the measurement value sent from the measuring unit 153. The signal generator 162 sends the measurement signal to the transmitter 154. The transmitter 154 modulates the measurement signal sent from the signal generator 162 and transmits the modulated measurement signal to the wireless control apparatus 100. The measurement signal is received by the receiver 101 as a reception signal.

The processor 160 including the power controller 161 and the signal generator 162 is an electronic circuit including a controller and an arithmetic apparatus. Examples of the electronic circuit can include a general-purpose processor, a central processing unit (CPU), a microprocessor, a digital signal processor (DSP), an ASIC, an FPGA, and a combination of the foregoing.

The components of the control target apparatus 150 are explained above. Connection among the components may be wired connection or may be wireless connection.

Figure 4:
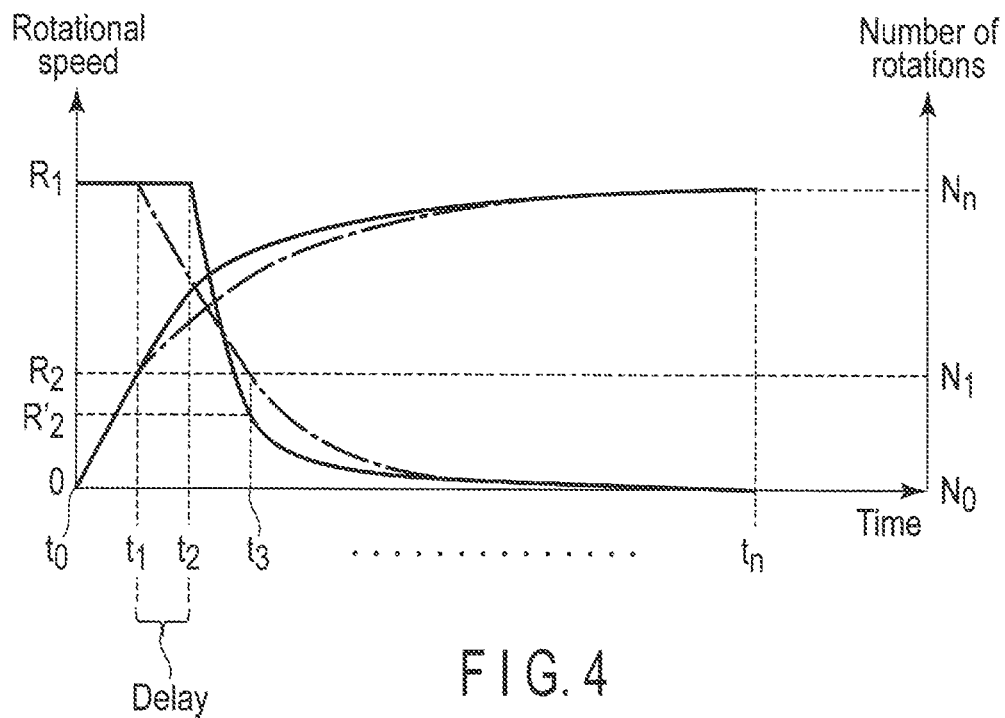
FIG. 4 is a diagram for explaining an example of an instruction for a target value by the wireless control apparatus and driving of the control target apparatus.

The wireless control apparatus 100 is an apparatus that receives the measurement signal including the measurement value of the control target apparatus 150 and modifies, according to the state of the wireless communication between the wireless control apparatus 100 and the control target apparatus 150, the target value transmitted to the control target apparatus 150. The operations of the wireless control apparatus 100 and the control target apparatus 150 are explained with reference to FIG. 4 showing time, the number of rotations, and rotational speed of the power unit 152. In FIG. 4, the power unit 152 is rotating at rotational speed $R_1$ at time $t_0$ and the number of rotations, which is a measurement value, is $N_0$. Originally assumed operation of the power unit 152 is operation for reducing rotational speed at time $t_1$ when the number of rotations is $N_1$ or more, gradually reducing the rotational speed, and reducing the rotational speed to 0 when the number of rotations is $N_n$. In FIG. 4, the rotational speed is represented by an alternate long and short dash line. In this case, it is assumed that a target value of the rotational speed at time $t_3$ is $R_2$. The target value in this originally assumed case is a provisional value calculated on the premise that the state of the wireless communication is not deteriorated.

On the other hand, when the state of the wireless communication between the wireless control apparatus 100 and the control target apparatus 150 is deteriorated, it is assumed that a transmission signal transmitted to the control target apparatus 150 is delayed. While the transmission of the transmission signal is delayed, the power unit 152 maintains the rotational speed $R_1$. Therefore, the rotational speed cannot be reduced even if the number of rotations exceeds $N_1$. Thus, when determining that the state of the wireless communication is deteriorated, the wireless control apparatus 100 modifies, considering the delay of the transmission signal, the target value of the rotational speed to be smaller than the originally assumed target value. For example, the wireless control apparatus 100 calculates rotational speed at time $t_3$ as a provisional value $R_2$. However, since the wireless control apparatus 100 determines that the state of the wireless communication is deteriorated, the wireless control apparatus 100 modifies the rotational speed to $R_{2'}$ smaller than the provisional value and sets $R_{2'}$ as a target value. In FIG. 4, the rotational speed is represented by a solid line. In this case, it is assumed that a decrease in the rotational speed has started at time $t_2$ because of the delay of the transmission signal. Thereafter, when determining that the state of the wireless communication is deteriorated, the wireless control apparatus 100 modifies, considering the delay of the transmission signal, the rotational speed to a value smaller than the provisional value (to a value closer to 0), sets the value as a target value, and finally reduces the rotational speed to 0 at the number of rotations $N_n$. Consequently, even if the delay of the transmission signal occurs, it is possible to reduce the rotational speed to 0 at the number of rotations $N_n$.

Figure 5:
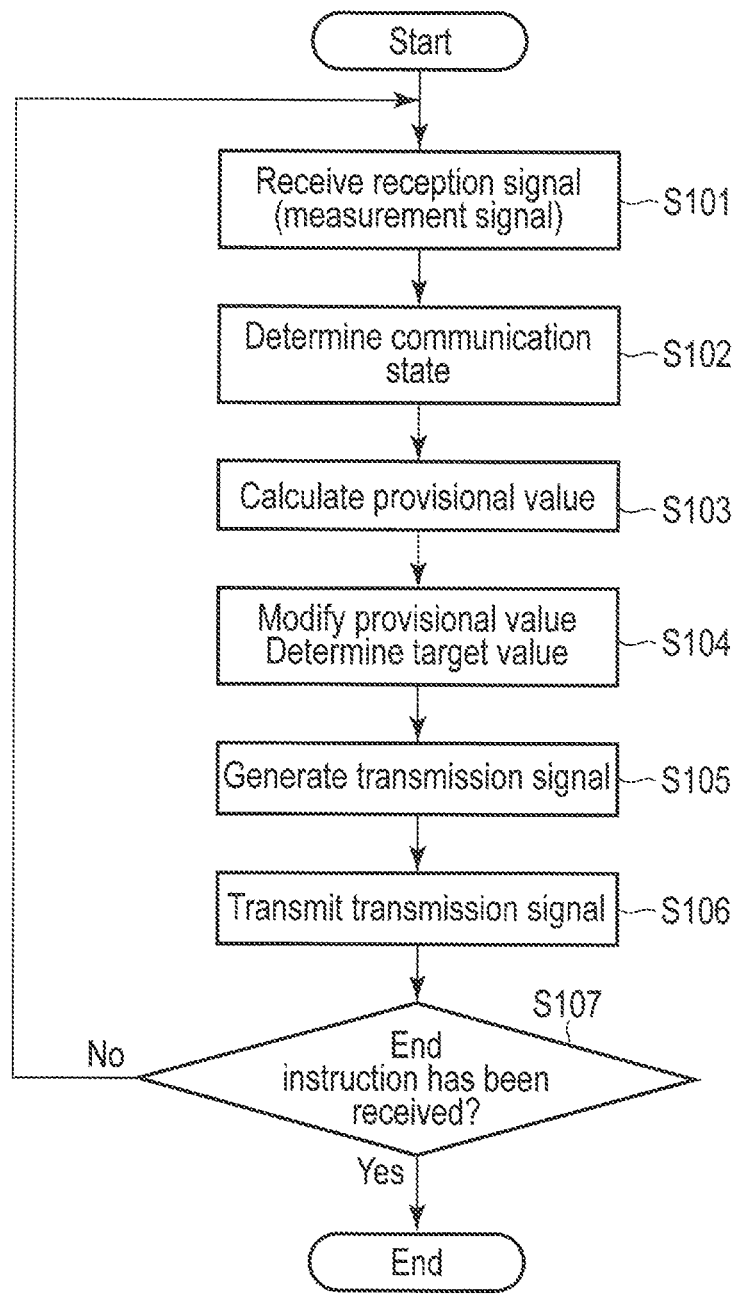
FIG. 5 is a flowchart of the operation of the wireless control apparatus.

An example of the number of rotations of the power unit 152 and the target value of the rotational speed included in the transmission signal is explained above. The operation of the wireless control apparatus 100 and the operation of the control target apparatus 150 in this example are explained in detail below with reference to FIGS. 5 to 7. FIG. 5 is a flowchart of the operation of the wireless control apparatus 100. FIG. 7 is a flowchart of the operation of the control target apparatus 150. As an example for explanation, it is assumed that setting of a target value by a transmission signal and communication of a measurement value by a measurement signal have been already performed once between the wireless control apparatus 100 and the control target apparatus 150.

The receiver 101 receives the measurement signal from the control target apparatus 150 as a reception signal (step S101). The reception signal includes a measurement value of the number of rotations in the power unit 152 of the control target apparatus 150 (hereinafter simply referred to as number of rotations as well). The receiver 101 decrypts the reception signal and sends the measurement value to the signal generator 112. The receiver 101 has measured electric power of a signal in the wireless communication link for a preset time. The receiver 101 sends, according to the electric power of the signal, to the determining unit 111, a signal indicating whether the wireless control apparatus 100 and the control target apparatus 150 are communicable. The preset time is optional. The measurement of the electric power of the signal by the receiver 101 and the communication of the signal indicating whether the wireless control apparatus 100 and the control target apparatus 150 are communicable may be performed irrespective of steps.

The determining unit 111 determines the state of the wireless communication between the wireless control apparatus 100 and the control target apparatus 150 based on the signal indicating whether the wireless control apparatus 100 and the control target apparatus 150 are communicable sent from the receiver 101 (step S102). In this embodiment, as an example, the determining unit 111 measures a time in which the wireless control apparatus 100 and the control target apparatus 150 are uncommunicable and calculates a ratio to a preset time. The determining unit 111 determines the state of the wireless communication based on the ratio. For example, when the ratio exceeds a preset threshold, the determining unit 111 determines that the state of the wireless communication is deteriorated. The determining unit 111 sends information representing the determined state of the wireless communication to the signal generator 112.

The signal generator 112 calculates a provisional value based on the measurement value sent from the receiver 101 (step S103). In this embodiment, as an example, the signal generator 112 calculates rotational speed of the control target apparatus 150 from the measurement value of the number of rotations sent from the receiver 101 and calculates a provisional value of the rotational speed. For example, the signal generator 112 calculates rotational speed at time $t_3$ as $R_2$.

The signal generator 112 modifies the calculated provisional value based on the information representing the state of the wireless communication sent from the determining unit 111 and determines a target value corresponding to the state of the wireless communication (step S104). In this embodiment, as an example, the signal generator 112 modifies the calculated provisional value based on the information representing the state of the wireless communication sent from the determining unit 111 and determines the modified provisional value as a target value. For example, when the state of the wireless communication is deteriorated, the signal generator 112 determines the target value of the rotational speed as a value $R_2$, smaller than $R_2$. When the state of the wireless communication is not deteriorated, the signal generator 112 does not modify the provisional value and determines the provisional value as the target value. The signal generator 112 generates a transmission signal including the determined target value (step S105) and stores the transmission signal to the storage 102.

The transmitter 103 extracts the transmission signal stored by the storage 102 according to the LIFO, modulates the transmission signal, and transmits the modulated transmission signal to the control target apparatus 150 (step S106). The LIFO is a scheme for preferentially extracting a transmission signal input at later time as shown in FIG. 6.

Figure 6:
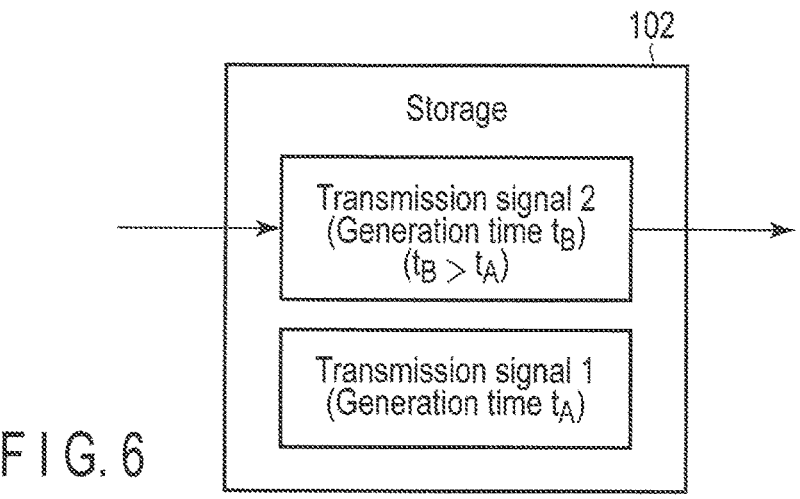
FIG. 6 is a diagram for explaining LIFO of a storing unit.
Figure 7:
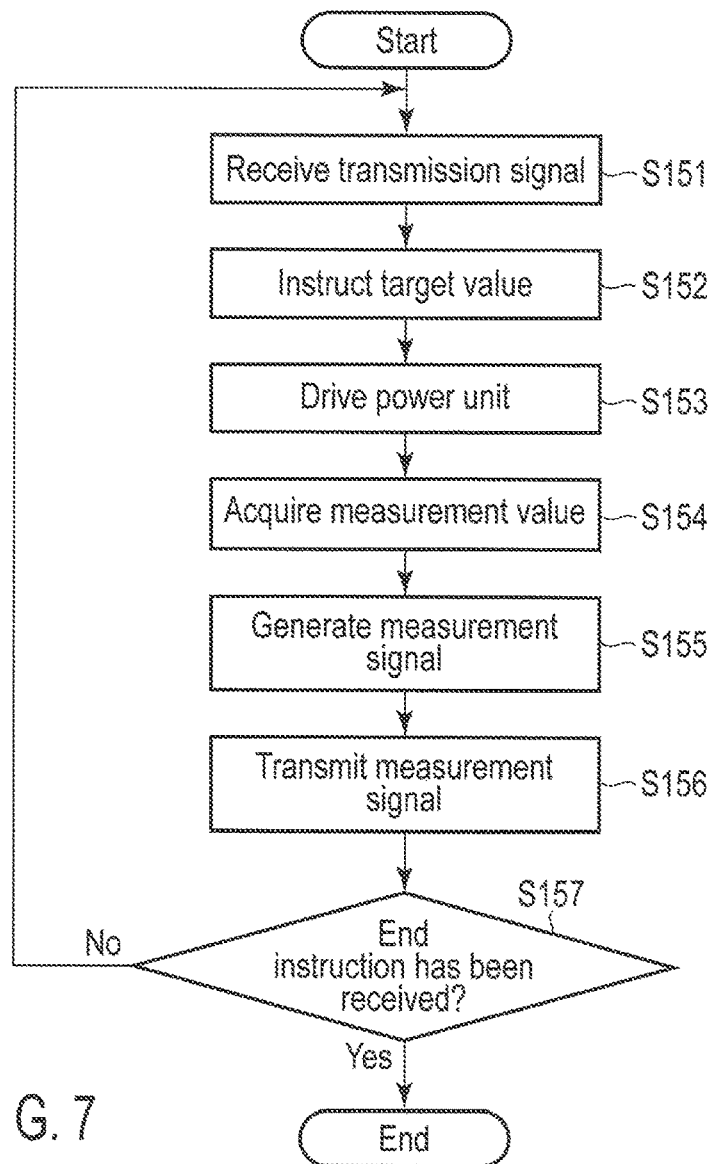
FIG. 7 is a flowchart of the operation of the control target apparatus.

In FIG. 6, the storage 102 stores a transmission signal 1 and a transmission signal 2. Time when the transmission signal 1 is generated is $t_A$ and time when the transmission signal 2 is generated is $t_B$. Since the time $t_B$ is later than the time $t_A$, the transmission signal 2 is a signal generated later than the transmission signal 1. In this case, the transmitter 103 extracts the transmission signal 2. When the state of the wireless communication is deteriorated and the transmission signal cannot be transmitted soon, the target value of the old transmission signal is likely to be unsuitable for the operation of the control target apparatus 150. Therefore, the transmitter 103 preferentially extracts the transmission signal generated later.

The determining unit 111 confirms whether an end instruction for ending the operation of the wireless control apparatus 100 has been received (step S107). The end instruction is an instruction for ending the operation of the wireless control apparatus 100 in this flow. The end instruction is input to the wireless control apparatus 100 by a user or the wireless control apparatus 100 acquires a signal including the end instruction, whereby the end instruction is conveyed to the determining unit 111. The end instruction may be an instruction for immediately ending the operation of the wireless control apparatus 100.

When the end instruction has not been received by the determining unit 111 (No in step S107), the flow returns to step S101. On the other hand, when the end instruction has been received by the determining unit 111 (Yes in step S107), the flow ends and the wireless control apparatus 100 ends the operation.

The operation of the wireless control apparatus 100 in this embodiment is explained above. The operation of the control target apparatus 150 is explained below. The control target apparatus 150 is driven to achieve a target value transmitted from the wireless control apparatus 100. The control target apparatus 150 measures a physical quantity related to the operation and transmits a measurement signal including a measurement value of the physical quantity to the wireless control apparatus 100. In this embodiment, for explanation, it is assumed that setting of a target value by a transmission signal and communication of a measurement value by a measurement signal have been already performed once or more between the wireless control apparatus 100 and the control target apparatus 150. Therefore, it is assumed that the measuring unit 153 is continuing measurement of the number of rotations of the power unit 152 during the operation of the control target apparatus 150 explained below.

The receiver 151 receives a transmission signal transmitted from the wireless control apparatus 100 (step S151). The receiver 151 decrypts the transmission signal and sends a target value of rotational speed included in the transmission signal to the power controller 161. The power controller 161 instructs the power unit 152 to be driven according to the target value sent from the receiver 151 (step S152). The power unit 152 is driven to achieve the instruction of the control signal sent from the power control unit 161 (step S153). In this embodiment, as an example, the power unit 152 is driven at the rotational speed of the target value.

The measuring unit 153 acquires a measurement value of the number of rotations of the power unit 152 being measured and sends the measurement value to the signal generator 162 (step S154). Timing when the measuring unit 153 sends the measurement value is optional. However, in this embodiment, as an example, the measuring unit 153 sends a measurement value of the number of rotations at every preset time to the signal generator 162 together with time when the measurement value is acquired. Note that the addition of the time when the measurement value is acquired may be performed by the signal generator 162.

The signal generator 162 generates a measurement signal including the measurement value sent from the measuring unit 153 (step S155). Timing when the signal generator 162 generates the measurement signal is optional. In this embodiment, as an example, the timing is a preset time. A plurality of measurement values may be included in the measurement signal. The signal generator 162 sends the generated measurement signal to the transmitter 154. The transmitter 154 modulates the measurement signal sent from the signal generator 162 and transmits the modulated measurement signal to the wireless control apparatus 100 (step S156).

The power controller 161 confirms whether an end instruction for ending the operation of the control target apparatus 150 has been received (step S157). The end instruction is an instruction for ending the operation of the control target apparatus 150 in this flow. The end instruction is input to the control target apparatus 150 by the user or the control target apparatus 150 acquires a signal including the end instruction, whereby the end instruction is conveyed to the power controller 161. The end instruction may be an instruction for immediately ending the operation of the control target apparatus 150.

When the end instruction has not been received by the power controller 161 (No in step S157), the flow returns to step S151. On the other hand, when the end instruction has been received by the power controller 161 (Yes in step S157), the flow ends. The control target apparatus 150 ends the operation.

The operations of the wireless control apparatus 100 and the control target apparatus 150 in this embodiment are explained above. Various modifications can be implemented and executed. Modifications applicable to this embodiment are explained below.

(Modification 1)

In this embodiment, the determining unit 111 determines the state of the wireless communication between the wireless control apparatus 100 and the control target apparatus 150 based on the signal indicating whether the wireless control apparatus 100 and the control target apparatus 150 are communicable sent from the receiver 101. To determine the state of the wireless communication, various examples are applicable other than the above.

The determining unit 111 may receive the decrypted reception signal from the receiver 101 and determine the state of the wireless communication based on the information included in the reception signal. For example, when using the measurement value, the determining unit 111 may compare the measurement value with the target value transmitted to the control target apparatus 150. When the target value is 1000 rpm, the power unit 152 rotates 16.7 times per second. The determining unit 111 may compare the target value and the number of rotations per second of the measurement value and determine the state of the wireless communication according to whether a difference between the target value and the number of rotations exceeds a preset threshold.

The determining unit 111 may determine the state of the wireless communication according to a time interval of a frame of the reception signal sent from the receiver 101. When the state of the wireless communication is deteriorated, the time interval of the frame of the reception signal sent from the receiver 101 increases. The determining unit 111 may measure the time interval and determine the state of the wireless communication according to whether the time interval exceeds a preset threshold. The time interval may be a time period from time when communication of a certain frame to the determining unit 111 is started until time when communication of the next frame to the determining unit 111 is started or may be a time period from time when communication of a certain frame to the determining unit 111 is ended until time when communication of the next frame to the determining unit 111 is started.

The determining unit 111 may determine the state of the wireless communication from information indicating whether the measurement signal is retransmitted included in the reception signal. The determining unit 111 may acquire a data size of a frame included in the reception signal and determine the state of the wireless communication according to whether the data size exceeds a preset threshold.

The determining unit 111 may acquire information concerning an MCS of the reception signal and determine the state of the wireless communication according to a type of the MCS. The determining unit 111 may acquire information concerning strength (a level) of electric power of the reception signal from the receiver 101 and determine the state of the wireless communication according to whether the strength (the level) exceeds a preset threshold.

The determining unit 111 may acquire information concerning a transmission signal generated in the past rather than the reception signal to determine the state of the wireless communication. For example, the state of the wireless communication can be determined even in the case of the transmission signal according to the various kinds of information included therein. Not only presence or absence of retransmitting but also the number of times of retransmitting can be acquired according to the information indicating whether the transmission signal is retransmitted. The determining unit 111 may determine the state of the wireless communication from information representing the number of times of retransmitting of the transmission signal. Besides, the determining unit 111 may acquire information concerning a transmission rate of the transmission signal and determine the state of the wireless communication according to whether the transmission rate exceeds a preset threshold. The determining unit 111 may determine the state of the wireless communication according to whether the number of transmission signals stored in the storage 102 exceeds a preset threshold. The number of transmission signals may be the number of frames or may be a data size.

The determining unit 111 determines whether the state of the wireless communication is deteriorated. However, the determining unit 111 may determine degrees of the deterioration in the state of the wireless communication in a plurality of stages. For example, the determining unit 111 may determine degrees of the deterioration in the state of the wireless communication according to a preset plurality of thresholds. The signal generator 112 may receive the degrees of the deterioration determined by the determining unit 111 and use the degrees of the deterioration for the modification of the target value. For example, in this embodiment, when the state of the wireless communication is deteriorated, the signal generator 112 modifies the target value of the rotational speed of the power unit 152 to be small. The signal generator 112 may modify the target value of the rotational speed of the power unit 152 to be smaller as a deterioration degree of the wireless communication is larger. By modifying the target value according to the deterioration degree of the state of the wireless communication, the wireless control apparatus 100 can instruct the operation to the control target apparatus 150 while improving the state of the wireless communication.

The determining unit 111 determines that the state of the wireless communication is deteriorated. However, the determining unit 111 may determine whether the state of the wireless communication is satisfactory and whether the state of the wireless communication is satisfactory, normal, or deteriorated. The signal generator 112 may calculate, as a provisional value, a value of the state of the wireless communication assumed to be normal or deteriorated and modify the provisional value and determine a target value when the state of the wireless communication is better than the assumed state of the wireless communication.

The methods of determining the state of the wireless communication explained above may be used in combination.

(Modification 2)

The operation of the wireless control apparatus 100 explained with reference to FIG. 5 and the operation of the control target apparatus 150 explained with reference to FIG. 7 may be partially independent. An example in which the operation of the wireless control apparatus 100 and the operation of the control target apparatus 150 are independent is explained below.

In the wireless control apparatus 100, the reception of the reception signal in step S101 and the determination of the state of the wireless communication in step S102 may be independent. The reception and the decryption of the reception signal and the communication of the measurement value in step S101 are performed as appropriate when the reception signal is received. The determination of the state of the wireless communication in step S102, the calculation of the provisional value in step S103, the modification of the provisional value and the determination of the target value in step S104, and the generation of the transmission signal in step S105 may be performed according to timing of generation of a transmission signal preset in the wireless control apparatus 100.

In the control target apparatus 150, the reception of the transmission signal to the driving of the power unit (steps S151 to S153), the acquisition of the measurement value in step S154, the generation and the transmission of the reception signal in steps S155 and S156, and the like may be independent. The steps from the reception of the transmission signal to the driving of the power unit (steps S151 to S153) are performed as appropriate when the control target apparatus 150 receives the transmission signal. The acquisition of the measurement value in step S154 is performed at preset time. For example, the acquisition of the measurement value in step S154 is performed at every second. The generation and the transmission of the reception signal in steps S155 and S156 are performed at preset time. For example, the generation and the transmission of the reception signal in steps S155 and S156 are performed at every ten seconds. The reception signal may include a measurement value for ten seconds.

(Modification 3)

In the above explanation of this embodiment, the wireless control apparatus 100 reduces the target value of the rotational speed according to the state of the wireless communication. However, the target value is not limited to the rotational speed. The wireless control apparatus 100 may modify the number of rotations (a rotation angle) set as a goal and, at the same time, modify the rotational speed. For example, when the control target apparatus 150 is a robot arm, the robot arm rotates according to a rotation angle of a driving unit. When the state of the wireless communication is deteriorated, it is likely that deceleration of the rotating power unit 152 is delayed and the rotation angle exceeds a target value of the rotation angle. In the following explanation, a final target value of the rotation angle is θ1 and the signal generator 112 appropriately transmits, to the robot arm, a target value of the rotational speed for achieving the rotation angle θ1. The signal generator 112 calculates the rotation angle θ1 as a provisional value. When the determining unit 111 determines that the state of the wireless communication is deteriorated, the signal generator 112 modifies the rotation angle to θ1' smaller than θ1 and sets θ1' as a target value.

The operations of the wireless control apparatus 100 and the control target apparatus 150 in this case are the same as the operations explained in this embodiment. Therefore, explanation of the operations is omitted. As explained above, the wireless control apparatus 100 may modify the calculated various provisional values to be small and set the modified provisional values as target values. Consequently, it is possible to reduce likelihood that the control target apparatus 150 exceeds the provisional value of the rotation angle and collides with an object, a person, or the like.

(Modification 4)

In the above explanation of this embodiment, the wireless control apparatus 100 modifies the provisional value to be small according to the state of the wireless communication. Depending on application of the control target apparatus 150, the wireless control apparatus 100 may modify the provisional value to be large according to the state of the wireless communication. In the following explanation, as an example, rotational acceleration is set as a target value and a target value transmitted to the control target apparatus 150 in the past is modified.

Figure 8:
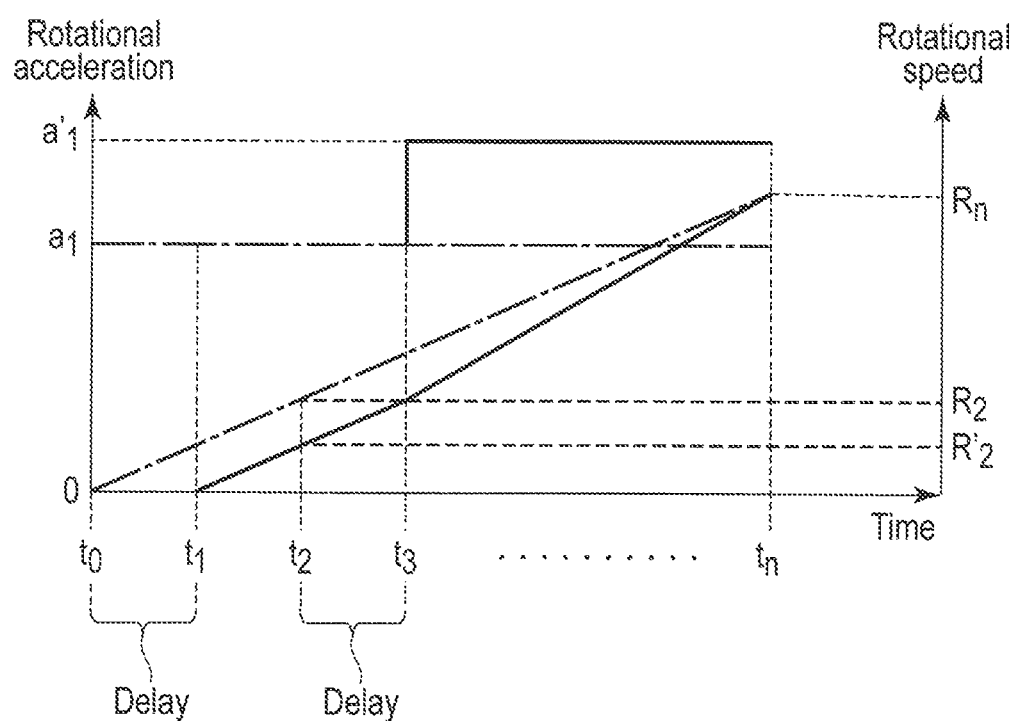
FIG. 8 is a diagram for explaining a different example of the instruction for the target value by the wireless control apparatus and the driving of the control target apparatus.

FIG. 8 is a diagram showing an example of rotational speed of the power unit 152 at time and rotational acceleration set as a target value. In FIG. 8, rotational speed 0 at time $t_0$ is increased to $R_n$ at time $t_n$. Originally assumed operation of the power unit 152 is operation for accelerating the power unit 152 at constant rotational acceleration $a_1$ from time $t_0$ and increasing the rotational speed to $R_n$ at time $t_n$. In FIG. 8, both of the rotational speed and the rotational acceleration are represented by alternate long and short dash lines. In this case, it is assumed that a measurement value of the rotational speed at time $t_2$ is $R_2$.

On the other hand, when the state of the wireless communication between the wireless control apparatus 100 and the control target apparatus 150 is deteriorated, it is assumed that a transmission signal transmitted to the control target apparatus 150 is delayed. The acceleration of the power unit 152 is delayed while the transmission signal is delayed. For example, in FIG. 8, it is assumed that the acceleration of the power unit 152 is performed from time $t_1$ because of the delay of the transmission signal. The delay in the acceleration of the power unit 152 can also be recognized from a measurement value received by the wireless control apparatus 100. For example, the rotational speed of the power unit 152 at time $t_2$ is assumed to be $R_2$ if there is no delay. However, actually, since the rotational speed is $R_2$', smaller than $R_2$, the wireless control apparatus 100 can recognize that a delay has occurred.

Therefore, when determining that the state of the wireless communication is deteriorated, the wireless control apparatus 100 modifies the target value of the rotational acceleration to be larger than the originally assumed target value (provisional value) considering the delay of the transmission signal and the delay in acceleration. For example, the wireless control apparatus 100 modifies the target value of the rotational acceleration at time $t_3$ to $a_1$' larger than $a_1$ transmitted to the control target apparatus 150 in the past. In FIG. 8, the rotational speed is represented by an alternate long and short dash line between time $t_0$ to time $t_3$, and is represented by a solid line after time $t_3$. In this case, transmission time of a transmission signal including the modified target value is set to time $t_2$. Acceleration at the rotational acceleration $a_1$' is performed from time $t_3$ because of the delay of the transmission signal. Consequently, even if the delay of the transmission signal occurs, the rotational speed can be increased to $R_n$ at time $t_n$.

The operations of the wireless control apparatus 100 and the control target apparatus 150 in this case are the same as the operations explained in this embodiment. Therefore, explanation of the operations is omitted. As explained above, the wireless control apparatus 100 may modify the target value to be increased according to the state of the wireless communication. For example, when the control target apparatus 150 is an AGV or the like, it is possible to reduce likelihood that acceleration of the AGV is delayed and the AGV collides with the other vehicle or the like.

(Modification 5)

In this embodiment, the signal generator 112 determines the target value using the measurement value measured by the measuring unit 153. The signal generator 112 may determine the target value according to an image acquired by the control target apparatus 150. In this case, the measuring unit 153 acquires an image of the outside of the control target apparatus 150. The measuring unit 153 is, for example, a camera.

Figure 9:
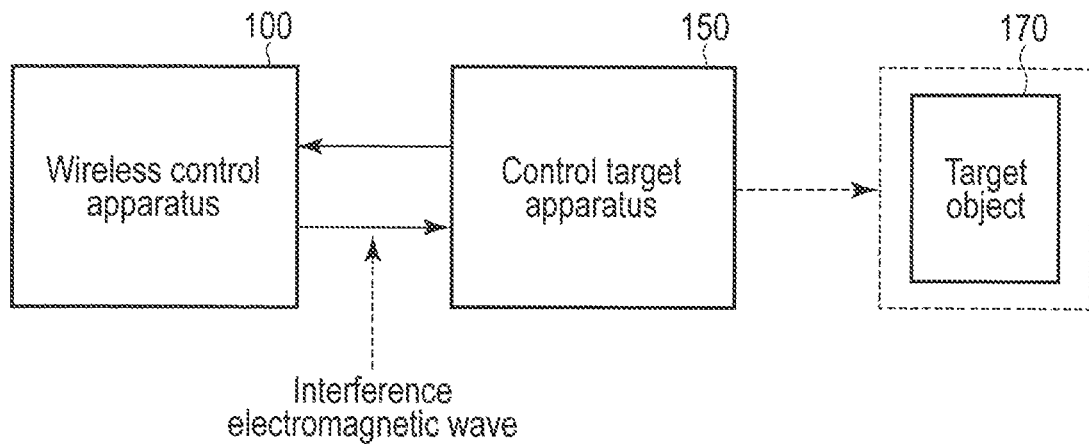
FIG. 9 is a diagram showing a modification of the communication system in the first embodiment.

A wireless communication system in this case is shown in FIG. 9. The measuring unit 153 acquires an image including a target object 170. The signal generator 112 calculates a position of the control target apparatus 150 from the image. The signal generator 112 determines the target value as in this embodiment from the calculated position of the control target apparatus 150.

The operations of the wireless control apparatus 100 and the control target apparatus 150 in this case are the same as the operations in this embodiment except that the measuring unit 153 acquires the image of the outside of the control target apparatus 150. Therefore, explanation of the operations is omitted. Even when the control target apparatus 150 acquires an image in this way, the wireless control apparatus 100 can instruct operation to the control target apparatus 150 while improving the state of the wireless communication.

(Modification 6)

In this embodiment, the determining unit 111 determines the state of the wireless communication according to the preset threshold. When the determining unit 111 determines the state of the wireless communication after determining deterioration in the state of the wireless communication, a different threshold may be set. For example, in determination after the deterioration in the state of the wireless communication is determined, the determining unit 111 determines the deterioration using a second threshold with which the deterioration is more easily determined.

When the determining unit 111 determines the deterioration in the state of the wireless communication, it is considered that a factor that hinders communication is present between the wireless control apparatus 100 and the control target apparatus 150. To stabilize the communication, it is necessary to determine, with a strict standard, whether the element that hinders the communication is eliminated. Therefore, in the determination after the determining unit 111 determines the deterioration in the state of the wireless communication, the determining unit 111 determines the deterioration using the second threshold with which the deterioration is more easily determined and determines, with the stricter standard, whether the element that hinders the communication is eliminated.

In the determination after the determining unit 111 determines the deterioration in the state of the wireless communication, the determining unit 111 may use a plurality of thresholds. For example, when the determining unit 111 determines even a deterioration degree of the state of the wireless communication, if the deterioration in the state of the wireless communication is determined, the determining unit 111 may determine the deterioration using a plurality of thresholds with which a larger deterioration degree is easily determined than a threshold concerning each deterioration degree. Consequently, it is possible to stabilize the communication between the wireless control apparatus 100 and the control target apparatus 150.

The modifications are explained above. As explained in this embodiment, the wireless control apparatus 100 modifies the target value transmitted to the control target apparatus 150 according to the state of the wireless communication. Consequently, it is possible to instruct the operation of the control target apparatus 150 while reducing the influence of the state of the wireless communication.

Second Embodiment

In the first embodiment, time when the signal generator 112 generates a transmission signal is not considered. In a wireless control apparatus 200, the signal generator 112 can generate a transmission signal according to a state of wireless communication by determining time when the signal generator 112 generates the transmission signal.

When the state of the wireless communication is deteriorated, in some case, a transmitter 103 is late in transmitting a transmission signal and the transmission signal is accumulated in the storage 102. The transmitter 103 transmits the transmission signal to the control target apparatus 150 according to LIFO. Therefore, a transmission signal generated anew is preferentially transmitted and the storage 102 stores old transmission signals. A timing generator 211 instructs generation timing of a transmission signal by the signal generator 112, whereby old transmission signals stored in the storage 102 can be reduced.

Figure 10:
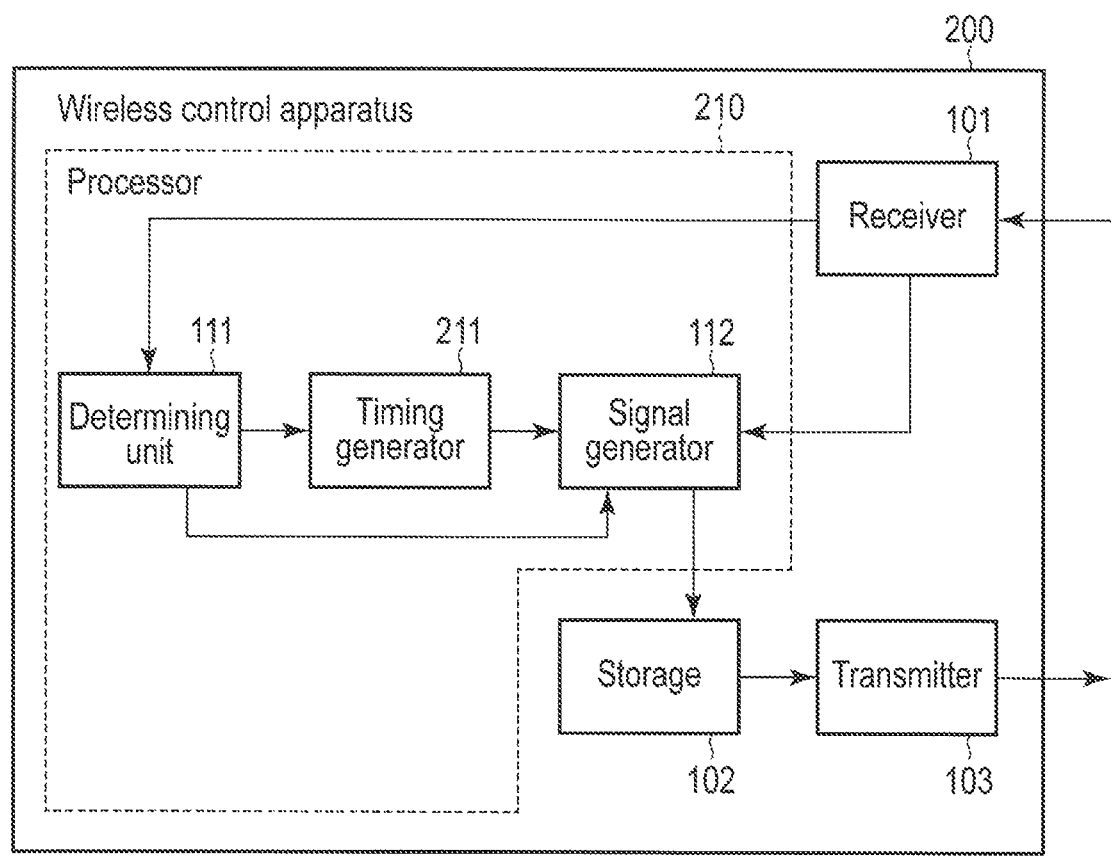
FIG. 10 is a configuration diagram of a wireless control apparatus according to a second embodiment.

Such a wireless control apparatus 200 is shown in FIG. 10. The wireless control apparatus 200 is an apparatus in which the timing generator 211 is added to the wireless control apparatus 100 explained in the first embodiment. A processor 210 including the timing generator 211 is the same as the processor 110 explained in the first embodiment. Among components of the wireless control apparatus 200, the same components as the components of the wireless control apparatus 100 are denoted by the same reference numerals and signs and explanation of the components is omitted. The control target apparatus 150 is the same as the control target apparatus 150 in the first embodiment. Therefore, explanation of the control target apparatus 150 is omitted.

The determining unit 111 sends information representing the determined state of the wireless communication not only to the signal generator 112 but also to the timing generator 211. This information is used in order to determine timing when the signal generator 112 generates a transmission signal.

The timing generator 211 determines, from the information representing the state of the wireless communication sent from the determining unit 111, time when the signal generator 112 generates a transmission signal. The timing generator 211 sends, according to the time, an instruction for generating a transmission signal to the signal generator 112. The timing generator 211 may instruct a time interval at which the signal generator 112 generates a transmission signal. The signal generator 112 generates a transmission signal according to the instruction sent from the timing generator 211.

Figure 11:
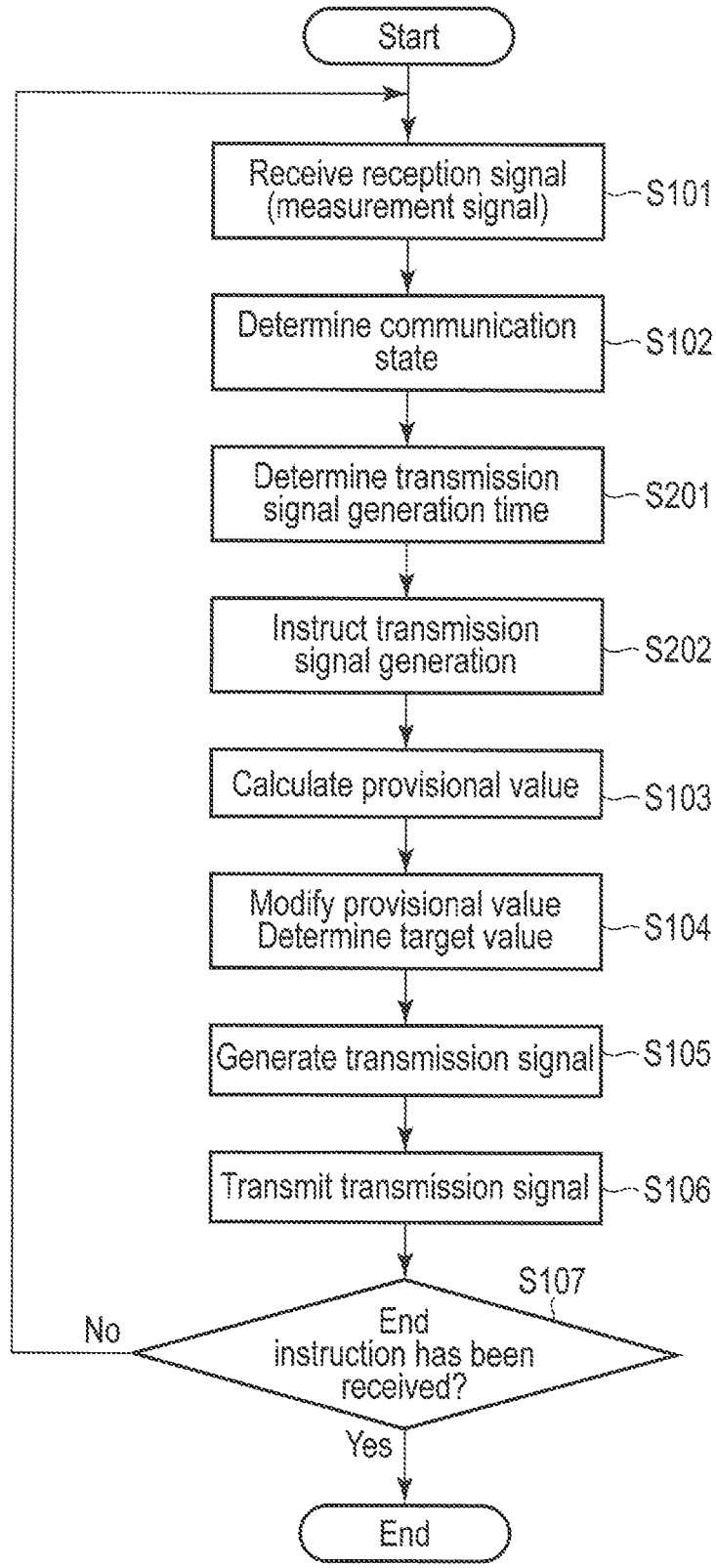
FIG. 11 is a flowchart of the operation of the wireless control apparatus.

The wireless control apparatus 200 is an apparatus that determines, according to the state of the wireless communication, timing for generating a transmission signal and generates a transmission signal based on the timing in addition to the operation of the wireless control apparatus 100. A flowchart of the operation of the wireless control apparatus 200 is shown in FIG. 11. Differences of the operation of the wireless control apparatus 200 from the operation of the wireless control apparatus 100 explained in the first embodiment are explained. The same steps as the steps of the wireless control apparatus 100 are denoted by the same signs and explanation of the steps is omitted.

In step S102, the determining unit 111 sends information representing the determined state of the wireless communication to the timing generator 211. The timing generator 211 determines, based on the state of the wireless communication, time when the signal generator 112 generates a transmission signal (step S201). In this embodiment, as an example, it is assumed that, when the state of the wireless communication is not deteriorated, the timing generator 211 instructs the signal generator 112 to generate a transmission signal at every 50 ms. When information indicating that the state of the wireless communication is deteriorated is sent from the determining unit 111, the timing generator 211 determines 200 ms as a time interval for instructing the signal generator 112 to generate a transmission signal.

The timing generator 211 instructs the signal generator 112 to generate a transmission signal at the determined time (step S202). A method of the instruction is optional. For example, the timing generator 211 may instruct the signal generator 112 to generate a transmission signal when the determined time comes or may designate a time for generating a transmission signal to the signal generator 112 set in advance. The timing generator 211 may instruct the signal generator 112 to generate a transmission signal at every determined time interval.

In step S103, the signal generator 112 generates a transmission signal according to the instruction sent from the timing generator 211. In this case, the signal generator 112 generates a transmission signal based on the latest measurement value among measurement values sent from the receiver 101.

The wireless control apparatus 200 in this embodiment is explained above. As in the first embodiment, various modifications can be implemented and executed. For example, the modifications explained in the first embodiment are applicable. Modifications applicable to this embodiment are also explained below.

(Modification 1)

In this embodiment, the state of the wireless communication determined by the determining unit 111 is used for determination of time in transmission signal generation and modification of a provisional value. The determining unit 111 may respectively determine a state of wireless communication for the determination of time in the transmission signal generation and a state of wireless communication for the modification of the provisional value.

(Modification 2)

The explanation of the operation of the wireless control apparatus 200 explained with reference to FIG. 11 is an example. A part of the steps in FIG. 11 may be replaced. That is, steps S201 and S202 explained with reference to FIG. 11 is not limited to be performed between steps S102 and S103.

(Modification 3)

When the determining unit 111 determines the state of the wireless communication in a plurality of stages, the timing generator 211 may determine, according to the respective stages, time when the signal generator 112 generates a transmission signal. For example, when the determining unit 111 determines a deterioration degree of the state of the wireless communication in a plurality of stages, the timing generator 211 may determine the time when the signal generator 112 generates a transmission signal to be later as the deterioration degree of the state of the wireless communication is larger.

Consequently, it is possible to generate a transmission signal according to the deterioration degree of the state of the wireless communication. It is possible to reduce old unnecessary transmission signals stored in the storage 102.

The modifications are explained above. As explained in this embodiment, the wireless control apparatus 200 determines, according to the state of the wireless communication, the time for generating a transmission signal. Consequently, in addition to the effects explained in the first embodiment, it is possible to generate a transmission signal according to the state of the wireless communication. It is possible to reduce old unnecessary transmission signals stored in the storage 102.

Third Embodiment

In the first embodiment and the second embodiment, the transmitter 103 extracts a transmission signal from the storage 102 in the LIFO scheme. In this case, when the state of the wireless communication is deteriorated and a delay occurs in transmission of a transmission signal by the transmitter 103, old transmission signals are accumulated in the storage 102. A wireless control apparatus 300 can effectively utilize the storage 102 by erasing old transmission signals accumulated in the storage 102 according to a state of wireless communication.

Figure 12:
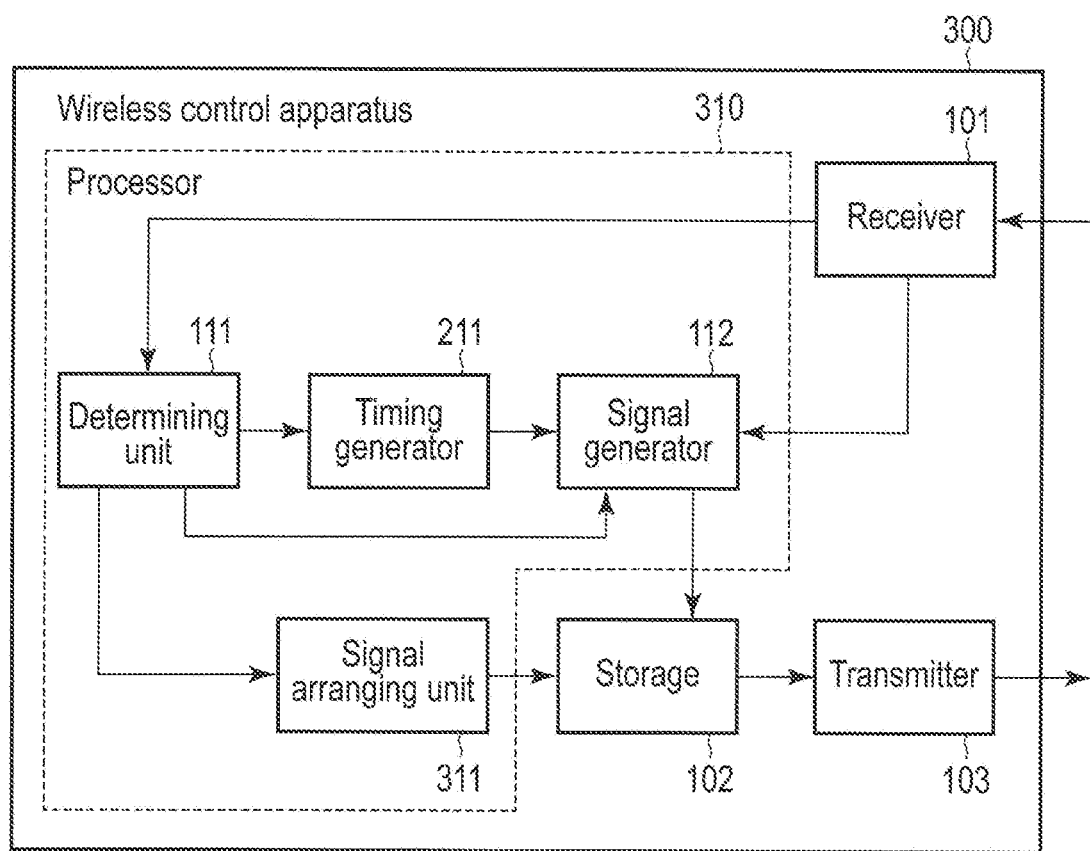
FIG. 12 is a configuration diagram of a wireless control apparatus according to a third embodiment.

Such a wireless control apparatus 300 is shown in FIG. 12. The wireless control apparatus 300 is an apparatus in which a signal arranging unit 311 is added to the wireless control apparatus 200 explained in the second embodiment. A processor 310 including the signal arranging unit 311 is the same as the processor 110 explained in the first embodiment and the processor 210 explained in the second embodiment. In the following explanation, among components of the wireless control apparatus 300, the same components as the components of the wireless control apparatus 100 and the wireless control apparatus 200 are denoted by the same reference numerals and signs and explanation of the components is omitted. Note that the control target apparatus 150 is the same as the control target apparatus 150 in the first and second embodiments. Therefore, explanation of the control target apparatus 150 is omitted.

The determining unit 111 transmits the information representing the determined state of the wireless communication to the signal arranging unit 311 besides the signal generator 112 and the timing generator 211. This information is used for determination of a transmission signal deleted by the signal arranging unit 311.

The signal arranging unit 311 deletes, based on the information representing the state of the wireless communication sent from the determining unit 111, signals generated at early times among transmission signals stored in the storage 102.

Figure 13:
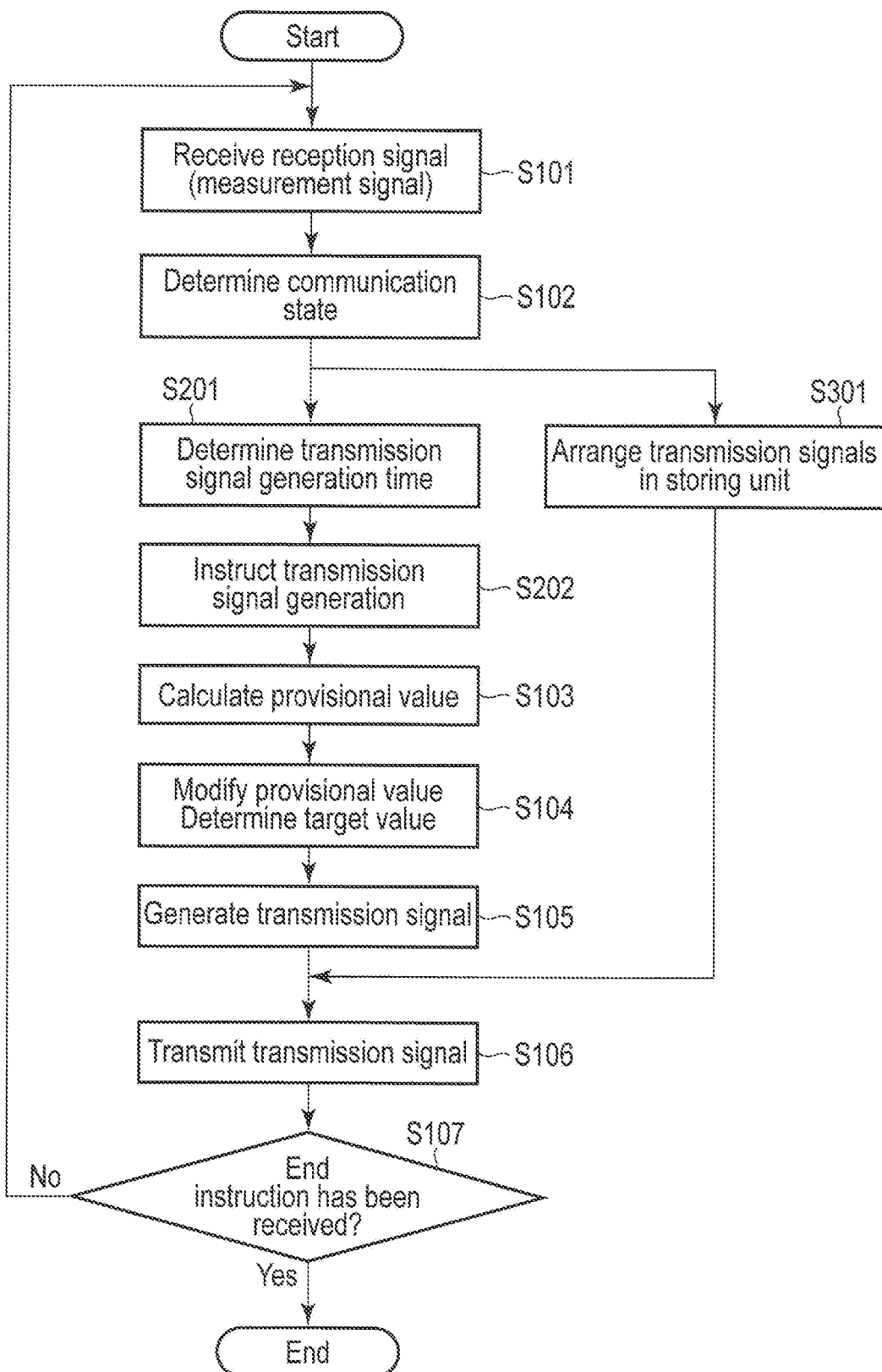
FIG. 13 is a flowchart of the operation of the wireless control apparatus.

The wireless control apparatus 300 is an apparatus that deletes, according to the state of the wireless communication, signals generated at early times among transmission signals stored in the storage 102 in addition to the operation of the wireless control apparatus 200. A flowchart of the operation of the wireless control apparatus 300 is shown in FIG. 13. Differences of the operation of the wireless control apparatus 300 from the operation of the wireless control apparatus 200 explained in the second embodiment are explained. The same steps as the steps in the wireless control apparatus 200 are denoted by the same signs and explanation of the steps is omitted.

In step S102, the determining unit 111 sends the information representing the determined state of the wireless communication to the signal arranging unit 311 as well. For example, the determining unit 111 sends information indicating that the state of the wireless communication is deteriorated to the signal arranging unit 311.

The signal arranging unit 311 deletes, based on the information representing the state of the wireless communication sent from the determining unit 111, signals generated at early times among the transmission signals stored in the storage 102 (step S301). For example, when the state of the wireless communication is deteriorated, the signal arranging unit 311 deletes a preset number of transmission signals in order from the oldest one.

The wireless control apparatus 300 in this embodiment is explained above. Various modifications can be implemented and executed as in the first embodiment and the second embodiment. For example, the modifications explained in the first embodiment and the second embodiment are applicable. Modifications applicable to this embodiment are also explained below.

(Modification 1)

Various modifications are applicable to the operation in which the signal arranging unit 311 deletes transmission signals stored in the storage 102. For example, when the determining unit 111 determines the state of the wireless communication in a plurality of stages, the signal arranging unit 311 may delete transmission signals according to the respective stages. When the determining unit 111 determines deterioration degrees of the state of the wireless communication in the plurality of stages, the signal arranging unit 311 may delete a larger number of transmission signals as a deterioration degree of the state of the wireless communication is larger.

(Modification 2)

In this embodiment, the state of the wireless communication determined by the determining unit 111 is use for determination of time in transmission signal generation, modification of a provisional value, and arrangement of transmission signals in the storing unit. The determining unit 111 may respectively determine states of the wireless communication applied to the determination of the time, the modification of the provisional value, and the arrangement of the transmission signals. The same state may not necessarily be applied to all of the states of the wireless communication applied to the determination of the time, the modification of the provisional value, and the arrangement of the transmission signals.

(Modification 3)

The explanation of the operation of the wireless control apparatus 300 explained with reference to FIG. 13 is an example. A part of the steps in FIG. 13 may be replaced. That is, step S301 explained with reference to FIG. 13 is applicable between step S102 and step S106 rather than being parallel processing.

Timing when the signal arranging unit 311 deletes transmission signals is not limited to the timing explained in this embodiment. The deletion of transmission signals may be performed at a time interval different from the time interval at which the determining unit 111 determines the communication state.

The modifications are explained above. As explained in this embodiment, the wireless control apparatus 300 deletes, according to the state of the wireless communication, the transmission signals generated at early times. Consequently, in addition to the effects explained in the first embodiment and the second embodiment, it is possible to delete transmission signals according to the state of the wireless communication. It is possible to effectively use the storage 102.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a receiver which receives a reception signal indicating a physical quantity related to operation of a control target device;
a processor which:
determines, based on a difference between the physical quantity and a target value of the physical quantity, a state of wireless communication between the electronic apparatus and the control target device;
modifies the target value based on the physical quantity and the state of wireless communication; and
generates a transmission signal indicating the modified target value;
a storage which stores the transmission signal; and
a transmitter which transmits the transmission signal to the control target device,
wherein:
the transmission signal includes a first transmission signal and a second transmission signal,
the processor generates the first transmission signal based on a state of the wireless communication determined at a first time, and generates the second transmission signal based on a state of the wireless communication determined at a second time later than the first time, and
the transmitter extracts the second transmission signal from the storage and transmits the second transmission signal to the control target device when the state of the wireless communication determined at the first time indicates deterioration and the first transmission signal and the second transmission signal are stored in the storage.

2. The electronic apparatus of claim 1, wherein the processor modifies the target value in a case in which the processor determines that the state of the wireless communication is a first state and does not modify the target value in a case in which the processor determines that the state of the wireless communication is a second state.

3. The electronic apparatus of claim 2, wherein the processor determines a stage from among a plurality of stages according to the state of the wireless communication in the first state and modifies the target value with a modification amount corresponding to the determined stage.

4. The electronic apparatus of claim 2, wherein the processor changes a time interval at which the transmission signal is generated from a first time interval to a second time interval longer than the first time interval in a case in which the processor determines that the state of the wireless communication is the first state.

5. The electronic apparatus of claim 1, wherein the physical quantity includes at least one of a position, a speed, an acceleration, a number of rotations, a rotational speed, and a rotational acceleration of the control target device.

6. The electronic apparatus of claim 1, wherein the physical quantity includes an image acquired by the control target device.

7. The electronic apparatus of claim 1, wherein the processor further determines a present state of the wireless communication based on a past determination result regarding the state of the wireless communication.

8. The electronic apparatus of claim 1, wherein the processor deletes the first transmission signal from the storage that stores the first transmission signal and the second transmission signal.

9. A method comprising:
receiving a reception signal indicating a physical quantity related to operation of a control target device;
determining, based on a difference between the physical quantity and a target value of the physical quantity, a state of wireless communication between the electronic apparatus and the control target device;
modifying the target value based on the physical quantity and the state of wireless communication;
generating a transmission signal indicating the modified target value;
storing the transmission signal in a storage; and
transmitting the transmission signal to the control target device, wherein:
the transmission signal includes a first transmission signal and a second transmission signal,
the first transmission signal is generated based on a state of the wireless communication determined at a first time, and the second transmission signal is generated based on a state of the wireless communication determined at a second time later than the first time, and
when the state of the wireless communication determined at the first time indicates deterioration and the first transmission signal and the second transmission signal are stored in the storage, the stored second transmission signal is extracted from the storage and transmitted to the control target device.

10. An electronic apparatus comprising:
a receiver which receives a reception signal indicating a physical quantity related to operation of a control target device;
a processor which:
   determines, based on a rate of time in which an electric power of a signal received by the receiver is at least equal to a predetermined level, a state of wireless communication between the electronic apparatus and the control target device;
   calculates, based on the physical quantity, a target value of the physical quantity for instructing operation of the control target device;
   modifies the target value based on the physical quantity and the state of wireless communication; and
   generates a transmission signal indicating the modified target value;
a storage which stores the transmission signal; and
a transmitter which transmits the transmission signal to the control target device,
wherein:
the transmission signal includes a first transmission signal and a second transmission signal,
the processor generates the first transmission signal based on a state of the wireless communication determined at a first time, and generates the second transmission signal based on a state of the wireless communication determined at a second time later than the first time, and
the transmitter extracts the second transmission signal from the storage and transmits the second transmission signal to the control target device when the state of the wireless communication determined at the first time indicates deterioration and the first transmission signal and the second transmission signal are stored in the storage.

11. The electronic apparatus of claim 10, wherein the processor modifies the target value in a case in which the processor determines that the state of the wireless communication is a first state and does not modify the target value in a case in which the processor determines that the state of the wireless communication is a second state.

12. The electronic apparatus of claim 11, wherein the processor determines a stage from among a plurality of stages according to the state of the wireless communication in the first state and modifies the target value with a modification amount corresponding to the determined stage.

13. The electronic apparatus of claim 10, wherein the physical quantity includes at least one of a position, a speed, an acceleration, a number of rotations, a rotational speed, and a rotational acceleration of the control target device.

14. The electronic apparatus of claim 10, wherein the physical quantity includes an image acquired by the control target device.

15. The electronic apparatus of claim 10, wherein the processor further determines a present state of the wireless communication based on a past determination result regarding the state of the wireless communication.

16. The electronic apparatus of claim 10, wherein the processor deletes the first transmission signal from the storage that stores the first transmission signal and the second transmission signal.

17. The electronic apparatus of claim 11, wherein the processor changes a time interval at which the transmission signal is generated from a first time interval to a second time interval longer than the first time interval in a case in which the processor determines that the state of the wireless communication is the first state.

18. A method comprising:
receiving a reception signal indicating a physical quantity related to operation of a control target device;
determining, based on a rate of time in which an electric power of a signal received in the receiving is at least equal to a predetermined level, a state of wireless communication between an electronic apparatus and the control target device;
calculating, based on the physical quantity, a target value of the physical quantity for instructing operation of the control target device;
modifying the target value based on the physical quantity and the state of wireless communication;
generating a transmission signal indicating the modified target value;
storing the transmission signal in a storage; and
transmitting the transmission signal to the control target device,
wherein:
the transmission signal includes a first transmission signal and a second transmission signal,
the first transmission signal is generated based on a state of the wireless communication determined at a first time, and the second transmission signal is generated based on a state of the wireless communication determined at a second time later than the first time, and
when the state of the wireless communication determined at the first time indicates deterioration and the first transmission signal and the second transmission signal are stored in the storage, the stored second transmission signal is extracted from the storage and transmitted to the control target device.

* * * * *